United States Patent
Kim

[11] Patent Number: 5,394,193
[45] Date of Patent: Feb. 28, 1995

[54] PATTERN-ADAPTIVE DIGITAL COMB FILTER FOR SEPARATION OF A LUMINANCE AND A COLOR SIGNAL

[75] Inventor: Jung H. Kim, Seoul, Rep. of Korea

[73] Assignee: SamSung Electronics Co., Ltd., Suwon, Rep. of Korea

[21] Appl. No.: 718,385

[22] Filed: Jun. 20, 1991

[30] Foreign Application Priority Data

Jun. 29, 1990 [KR] Rep. of Korea ............ 90-9721

[51] Int. Cl.⁶ .................................................. H04N 9/78
[52] U.S. Cl. .................................... 348/668; 348/667
[58] Field of Search ............ 358/31, 37; H04N 9/78; 348/663, 665, 666, 667, 668

[56] References Cited

U.S. PATENT DOCUMENTS

| 4,050,084 | 9/1977 | Rossi | 358/31 |
| 4,855,815 | 8/1989 | Yasuki et al. | 358/31 |
| 5,025,311 | 6/1991 | Hosoi | 358/31 |

FOREIGN PATENT DOCUMENTS

| 0111596 | 7/1983 | Japan | 358/31 |
| 0151592 | 8/1984 | Japan | 358/31 |
| 0148906 | 6/1990 | Japan | 358/31 |

OTHER PUBLICATIONS

Barton, Steve, "A Practical Charge-Coupled Device Filter for the Separation of Luminance and Chrominance Signals in a Television Receiver", IEEE Transaction on Consumer Electronics vol. CE-23 No. 3 Aug. 1977.

Primary Examiner—James J. Groody
Assistant Examiner—David E. Harvey
Attorney, Agent, or Firm—Robert E. Bushnell

[57] ABSTRACT

In a circuit(s) which separates luminance and color signals of the digital color television, the present invention can reduce the noise as a circuit which adaptively performs the 1H comb filtering or the 2H comb filtering according to the correlation between upper and lower horizontal scanning lines of three successive horizontal lines when the luminance and color signals from an input video signal are to be separated. Also, even if the irregular video signal is applied, the present invention can reduce the artifact(s), by passing it without comb-filtering operation.

29 Claims, 3 Drawing Sheets

PATTERN-ADAPTIVE DIGITAL COMB FILTER FOR SEPARATION OF A LUMINANCE AND A COLOR SIGNAL

BACKGROUND OF THE INVENTION

The present invention relates to a high definition digital television and more particularly to a pattern-adaptive digital comb filter which separates luminance and color signals by adaptive comb filtering according to the correlation between upper and lower horizontal scanning lines of three successive horizontal lines, when the luminance and color signals from an input video signal are to be separated.

In a conventional color TV, the process of separating the input video signal into the luminance and color signal is essential, and this process is carried out by a conventional comb filter.

In digital color televisions such as ID(Improved Definition) and ED(Extended Definition) televisions, in particular, which require high definition, the efficient separation of the luminance and color signals is required.

The comb filter is used on an assumption that the phase of color signal is inverted every 1 H(one horizontal scanning period. That is, the interleaving of the video signal in NTSC(National Television System Committee) method corresponds to this.

Also, the signals before and after 1 H must be similar.

FIGS. 1 (A) and (B) are conventional circuits for separating the luminance and color signals.

A circuit shown in FIG. 1 (A) is largely divided into two parts: One part is a 2 H comb filter 1, including first and second 1 H delays 1a and 1b, an adder 1c, first and second half-amplifiers 1d, and 1f, and a subtracter 1e, and the other part is an output stage 100 for providing the luminance and color signals, including a band pass filter (BPF) 102, a delay 104, and a subtracter 106.

Referring to FIG. 1 (A), when a digital video signal is applied through an input port 101, the digital video signal is delayed by 1 H in the first 1 H delay, 1a, and is subsequently applied to the second 1 H delay, 1b, the adder 1e, and the delay 104, in the output stage 100.

The second 1 H delay, 1b, delays the 1 H-delayed video signal once more, by 1 H, to provide a 2 H-delayed video signal to the adder 1C.

Then, the adder 1c adds the 2 H-delayed video signal to the input video signal. That is, a new video signal, in which luminance and color signal levels are added to each other by addition of two video signals with the same phase, appears at the output terminal of the adder 1c and is provided to the first half-amplifier 1d.

At this time, the first half-amplifier 1d decreases the level of the new video signal by half.

Thus, the video signal with an averaged level of a present input video signal V and a 2 H-delayed video signal are applied to the subtracter 1e. The subtracter 1e subtracts the averaged video signal from the 1 H-delayed video signal VH to remove the luminance signal components.

In the NTSC method, on the other hand, since the phases of the video signals before and after 1 H are inverse to each other, the phases of the color signals of the 2 H-delayed and the present input video signals are the same, while the phases of the color signals of the 1 H-delayed video signal VH and the 2 H-delayed video signal VHH, or the phases of the color signals of the 1 H-delayed and the present input video signals, are inverse.

Subtracting the averaged video signal from the 1 H-delayed video signal VH under an assumption that the luminance signal levels of the video signals before and after 1 H are almost equal to each other, the luminance signal components are cancelled, and only the sum of the color signal levels appears at the output terminal of the subtracter 1e.

Therefore, the second half-amplifier 1f provides the averaged value of the color signal levels of the 2 H-delayed video VHH and the present input video signal, by decreasing the sum of the color signal levels by half.

The output of the second half-amplifier 1f includes the color signal components filtered in a vertical direction and a complete color signal C is finally provided from the BPF 102.

At this time, the BFF 102 passes only the signal within color signal band in a horizontal direction.

Also, the delay 104 delays the 1 H-delayed video signal VH by a time that corresponds to the delayed time, until the generation of the complete color signal C passes through the aforementioned circuits to provide the 1 H-delayed video signal VH in synchronization with the color signal C.

Then, the subtractor 106 separates and provides only the luminance signal Y, by subtracting the color signal C from the 1 H-delayed video signal.

Therefore, the input digital video signal is separated into the digital luminance signal Y and color signal C.

At this time, the comb-filtering performed by the 2 H comb filter 1 means the separation of the color signal components, from the input video signal and the delayed video signal, by a predetermined time, while cancelling the luminance signal components.

As described above, the circuit shown in FIG. 1(A) can separate the luminance and color signals from the input video signal.

But, if the vertical transition occurs among the three successive horizontal scanning lines, the artifacts such as cross color and dot disturbance are generated in the circuit shown in FIG. 1 (A).

FIG. 1 (B) is another separation circuit of luminance and color signals comprising an adaptive 2 H comb filter.

Referring to FIG. 1 (B), a 1 H comb filter 2 comprises first and second 1 H delays 2a and 2b, subtracters 2c and 2d, and first and second half-amplifiers 2e and 2f.

An adaptive selection circuit 3 also comprises first~-third low pass filters (LPF) 3a~3c, subtracter 3d and 3e, first and second absolute value detector 3f and 3g and a correlation detector 3h.

Finally, an output stage for providing the luminance and color signals comprises a band pass filter (BPF) 102, a delay 104, and a sutracter 106.

In the circuit shown in FIG. 1 (B), if a digital video signal is applied through an input port 101, the input video signal is delay by 1 H in the first 1 H delay 2a and is subsequently applied to the second 1 H delay 2b, the subtracters 2c and 2d, the second LPF 3b, and the delay 104.

The second 1 H delay 2b delays the 1 H-delayed video signal once more by 1 H, to provide a 2 H-delayed video signal to the subtracter 2d and the third LPF 3c.

Therefore, the subtracter 2c subtracts the 1 H-delayed video signal VH from the input video signal V, through the input port 101. That is, the luminance signal components are cancelled by subtracting the 1 H-delayed video signal VH from the input video signal V, while the color signal components are added, since the phases of the color signals of the 1 H-delayed video signal and the present input video signal are inverse to each other and their luminance signals almost equal each other.

Then, the sum of the color signal component levels is provided to the first half-amplifier 2e.

On the other hand, the subtracter 2d subtracts the 1 H-delayed video signal VH from the 2 H-delayed video signal VHH.

Similarly, the luminance signal components are cancelled, while the levels of the color signal component are added, since the phases of the color signals of the 1 H-delayed video signal VH and the 2 H-delayed video signal VHH are inverse to each other and their luminance signal components almost equal to each other.

Therefore, the sum of the color signal components is provided from the subtracter 2d to the second half-amplifier 2f.

The first half-amplifier 2e provides a first averaged color signal component of the 1 H-delay video signal VH and the present input video signal V to an input port Io of a multiplexer 4 by decreasing the added color signal component of the subtracter 2c by a half.

Also, the second half-amplifier 2f provides a second averaged color signal component of the 1 H-delayed video signal to another input port Ii of the multiplexer 4, by decreasing the added color signal component in the subtracter 2d by a half.

On the other hand, the first~third LPF's 3a~3c filter the present input video signal V, the 1 H-delayed video signal VH, and the 2 H-delayed video signal VHH, to provide each luminance signal.

The subtracter 3d subtracts the output of the first LPF 3a from the output of the second LPF 3b and provides the result to the first absolute value detector 3f, while the subtracter 3e subtracts the output of the third LPF 3c from the output of the second LPF 3b and provides the result to the second absolute value detector 3g.

Then, the first absolute value detector 3f detects the absolute value of the output of the first subtracter 3d and provides the result to an input terminal of the correlation detector 3h, while the second absolute value detector 3g detects, the absolute value of the output of the second subtracter 3e and provides the result to another input port of the correlation detector 3h.

Therefore, the correlation detector 3h detects the correlation between the outputs of the two absolute value detectors 3f and 3g and provides a logic selection signal according to the detected degree of correlation to a selection signal input port S of the multiplexer 4.

At this time, the correlation detector 3h provides the selection signal so that the multiplexer 4 selects and provides the color signal component with a larger degree of correlation, that is, the comb-filtered color signal component corresponding to a smaller value part of the outputs of the first and second absolute value detectors 3f and 3g.

For example, if the output of the first absolute value detector 3f is smaller than that of the second absolute value detector, it means that the correlation between the input video signal V and the 1 H-delayed video signal VH is larger than the correlation between the 1 H-delay video signal VH and the 2 H-delayed video signal VHH.

Then, the selection signal provided from the correlation detector 3h becomes '0' so that the multiplexer 4 selects and provides the first color signal component generated by comb-filtering of the input video signal and the 1 H-delayed video signal.

On the contrary, if the output of the first absolute value detector 3f is larger than that of the second absolute value detector 3g, the multiplexer 4 selects and provides the second color signal component by the selection signal of '1'.

Next, the BPF 104 filters the first or second color signal component to provide the complete color signal c, and the delay 104 delays the 1 H-delayed video signal to provide it in synchronization with the color signal c.

Then the subtracter 104 subtracts the color signal c from the 1 H-delayed video signal VH to select and provide only the luminance signal.

The circuit shown in FIG. 1(B) can reduce the cross color phenomenon by the adaptive 1 H comb-filtering, according to the correlation among-the three horizontal scanning lines.

But even if the three horizontal scanning lines have a larger correlations to one another, the 1 H comb-filtering is carried out to one side.

In addition, even if an irregular video input that does not agree with the assumed condition of the comb filter is applied from a video tape recorder or a game player, the 1 H comb-filtering is carried out to one side. Thus, the possibility of error generation becomes large.

SUMMARY OF THE INVENTION

The present invention overcomes these problems and provides a pattern-adaptive digital comb filter for separation of a luminance and a color signal, which reduces the noise and the artifacts by adaptive 1 H or 2 H comb-filtering according to correlations among video signals on three horizontal scanning lines and by passing an irregular video input signal without comb-filtering in a separation circuit of a luminance and a color signal for a digital color television.

According to the present invention, there is provided a pattern-adaptive digital comb filter, the filter comprising: A comb filter for providing first and second 1 H comb data by 1 H comb-filtering of input video signals on three successive horizontal scanning lines, and for providing a 2 H comb data by 2 H comb-filtering, and for providing a 1 H-delayed video signal; a correlation, data generation, connected to the comb filter, for providing first and second correlation data, by detecting the low band transition of luminance signals produced from each horizontal line pair through low pass filtering of the first and second 1 H comb data and by detecting their absolute values; a multiplexer, connected to the comb filter, for selecting and providing one of the first and second 1 H comb data, the 2 H comb data, and the 1 H-delayed video signal, according to the logic state of a selection data applied to a selection terminal; and, a comb-filtering controller, connected to the correlation data generator and the multiplexer, for providing 2-bit selection data, to select the 2 H comb data, when both first and second correlation data are smaller than a reference data applied through a reference data terminal, and to select data with larger correlation between the first and second 1 H comb data, when both first and second comb data are not smaller than the reference data, and to select the 1 H-delayed video signal, when an irregular signal data applied through an irregular signal terminal is '1'.

DETAILED DESCRIPTION OF THE INVENTION

The present invention will be now described in more detail with reference to accompanying drawings.

Figure 1A:
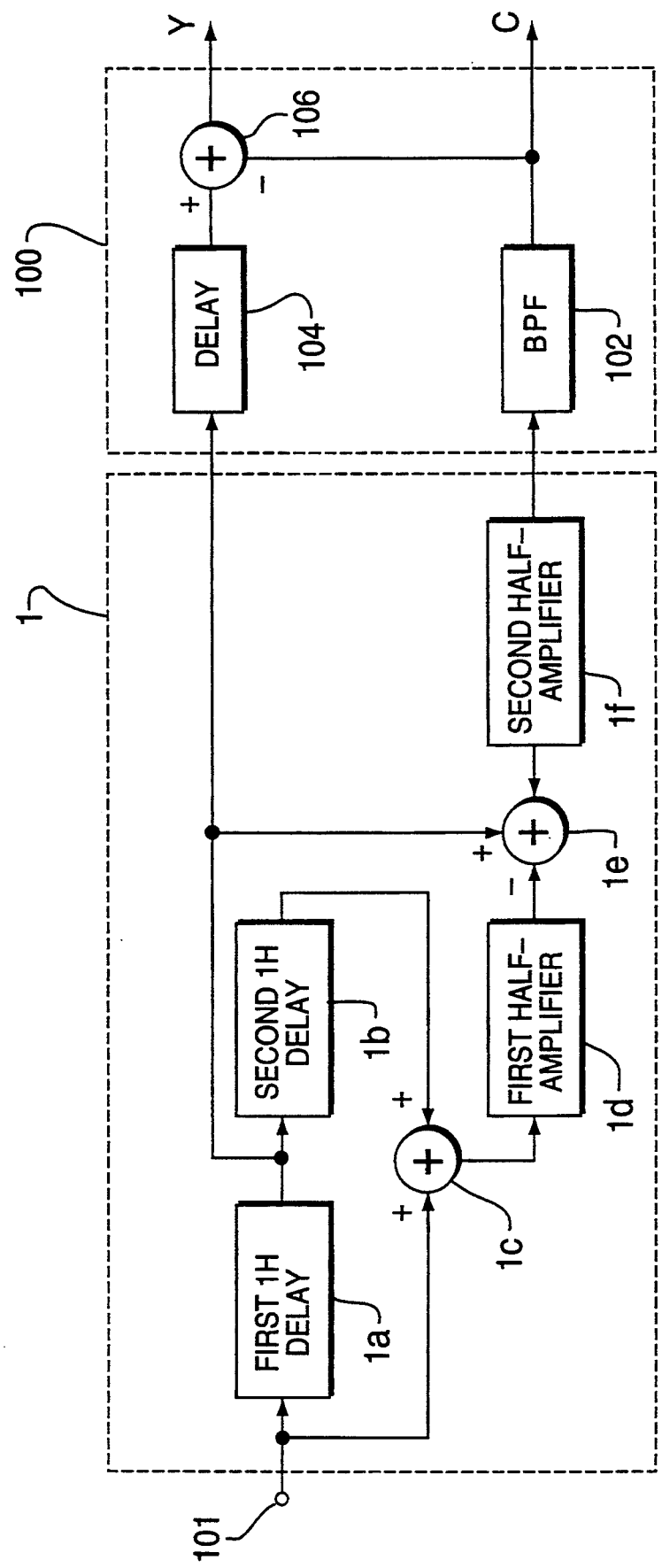
FIG. 1 (A) and (B) are block diagrams of the conventional circuits for separating luminance and color signals.
Figure 1B:
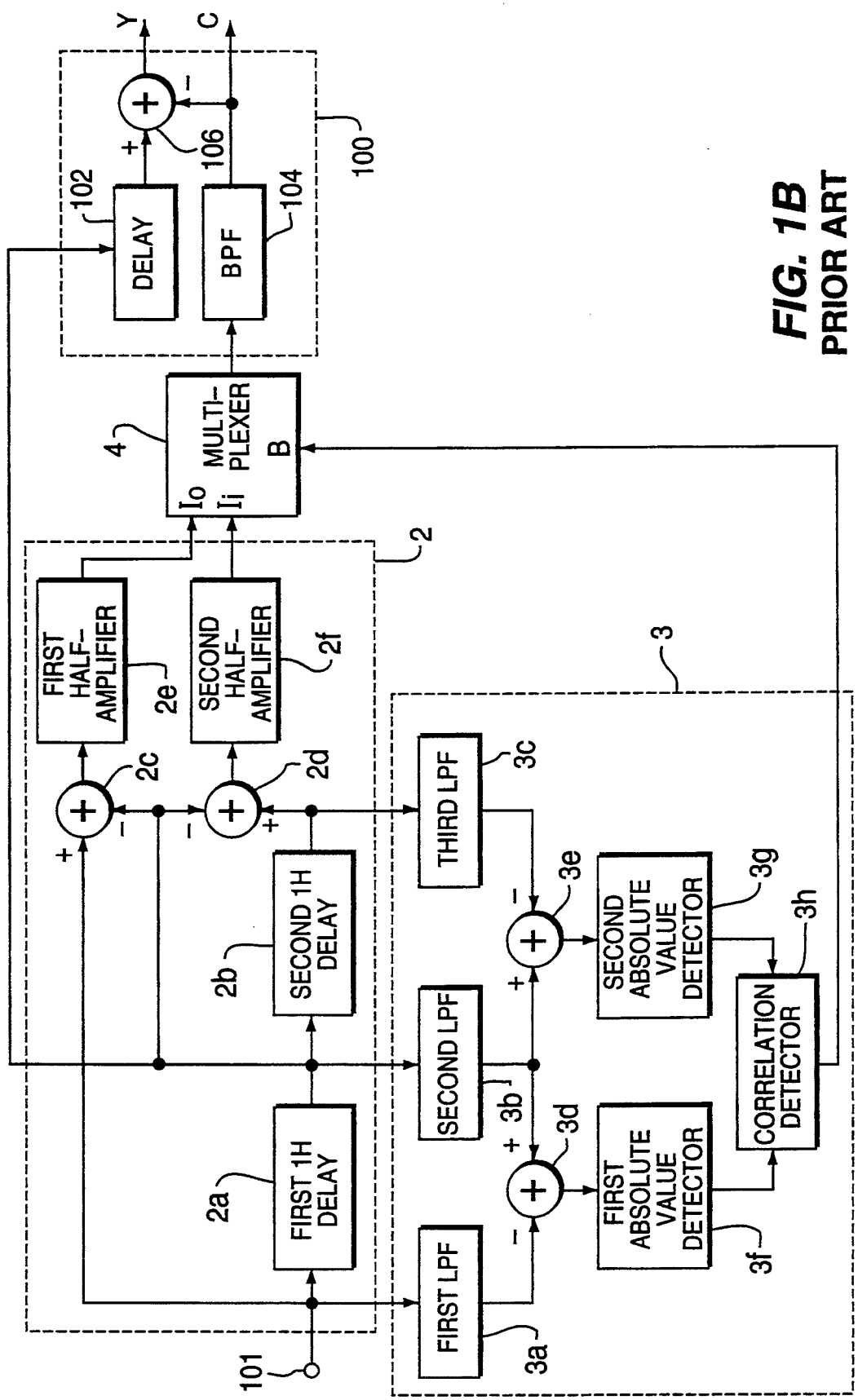
Figure 2:
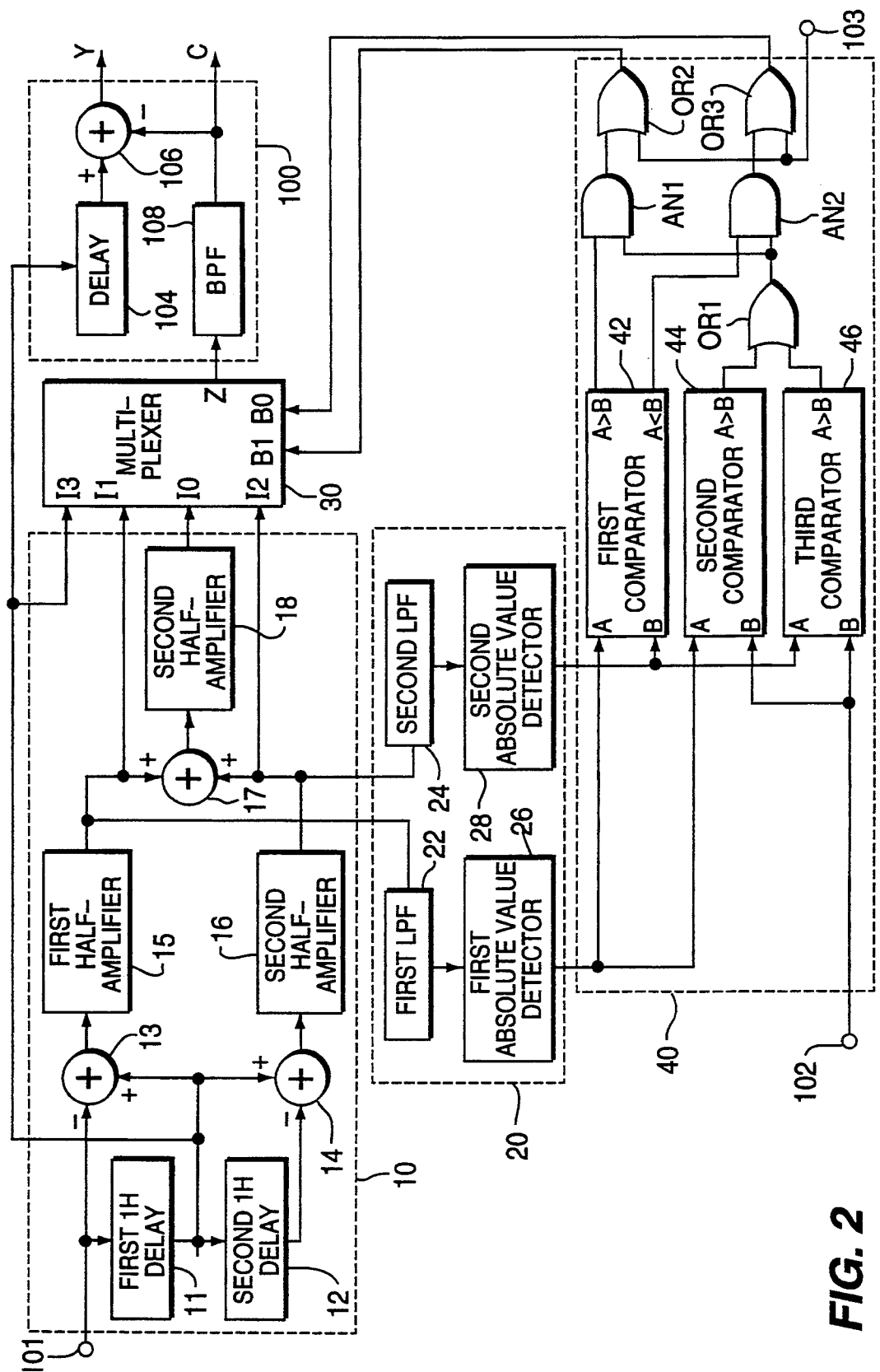
FIG. 2 is a block diagram of a pattern-adaptive digital comb filter for separation of a luminance and a color signal according to the present invention.

FIG. 2 shows a pattern-adaptive digital comb filter for separation of a luminance and a color signal according to the present invention.

A correlation data generator 20 and a multiplexer 30 are connected to a comb filter 10 for providing first and second 1 H comb data by the 1 H comb-filtering of video signals on three successive horizontal scanning lines applied through video signal input terminal and providing a 2 H comb data by 2 H comb-filtering, and providing a 1 H-delayed video signal.

In the comb filter 10, a second 1 H delay 12 for providing a 2 H-delayed video signal VHH by delaying a 1 H-delayed video signal VH once more is connected to a first 1 H delay 11, for providing the 1 H-delayed video signal VH by delaying a video signal V applied through a video signal input terminal 101.

Next, a subtracter 13 performs the 1 H comb-filtering by subtracting the presently applied video signal V from the 1 H-delayed output terminal of the first 1 H delay 11.

Also, another subtracter 14, for performing the 1 H comb-filtering by subtracting the 2 H-delayed video signal VHH from the 1 H-delayed video signal VH, is connected to the output stages of the first and second 1 H delays 11 and 12.

On the other hand, first and second half-amplifiers 15 and 16 are respectively connected to the subtracters 13 and 14, to provide first and second 1 H comb data after amplifying the outputs of the subtracters 13 and 14 by a half.

Also, an adder 17 for performing the 2 H comb-filtering, by adding the outputs of the first and second half-amplifiers 15 and 16 to each other, is connected to the output terminals of the first and second half-amplifiers 15 and 16.

Next, a third half-amplifier 18 for providing a 2 H comb data after amplifying the output of the adder 17 to half is connected to the output terminal of the adder 17.

In the correlation data generator 20, on the other hand, first and second LPF 22 and 24 are respectively connected to the output terminals of the first and second half-amplifiers 15 and 16, to detect the low band transition of luminance signal produced between each horizontal scanning line pairs by low pass filtering of the first and second 1 H comb data.

Next, first and second absolute value detector circuits 26 and 28, for providing first and second correlation data by detecting the absolute value of the low band transition, are connected to the first and second LPF 22 and 24, respectively.

Also, a multiplexer 30, of which input terminals $I_0 \sim I_3$ are connected to the output terminals of the comb filter 30, selects one of the first and second 1 H comb data, the 2 H comb data, and the 1 H-delayed video signal, according to the selection data applied to the selection terminals $B_0$ and $B_1$ and provides the selected data through an output terminal Z.

A comb-filtering controller 40 is connected simultaneously to the output terminal of the correlation data generator 20, and the selection terminals $B_0$ and $B_1$ of the multiplexer 30.

The comb-filtering controller 40 compares the first and second correlation data with the reference data applied to the reference input terminal 102, respectively.

Subsequently, the comb filtering controller 40 provides the selection data $B_0$ and $B_1$ to the multiplexer 30, so that if both the first and second correlation data are smaller than the reference data the 2 H comb data is selected. If both the first and second correlation data are larger than the reference data, one with the larger correlation of the first and second 1 H comb data is selected, and if the irregular data applied through the irregular signal input terminal 103 is '1', the 1 H-delayed video signal VH is selected.

The comb-filtering controller comprises first, second, and third comparators 42, 44, and 46, two AND gates AN1 and AN2, and three OR gates OR1, OR2, and OR3.

The first comparator 42, of which input terminals A and B are connected respectively to the output terminals of the first and second absolute value detectors 26 and 28, compares the first correlation data with the second correlation data and provides the comparison result through output terminals, A>B and A<B.

Also, the second comparator 44, of which input terminals A and B are connected respectively to the output terminals of the first absolute value detector 26 and the reference input terminal 102, compares the first correlation data with the reference data and provides the comparison result through an output terminal A>B.

The third comparator 46, of which input terminals A and B are connected respectively to the output terminal of the second absolute value detector 28 and the reference input terminal 102, compares the second correlation data with the reference data and provides the comparison result through an output terminal A>B.

Thus, the first, second, and third comparators, 42, 44, and 46, compare the magnitudes of two inputs applied to the input terminals A and B and provides '0' or '1' to the corresponding output terminals A<B and A>B, according to the comparison result.

An input terminal of the AND gate AN1 is connected to the output terminal of the OR gate OR1, of which two input terminals are connected to each output terminals A>B, of the second and third comparators 44 and 46, and another input terminal of the AND gate AN1 is connected to the output terminal A>B of the first comparator 42.

Also, an input terminal of the AND gate AN2 is connected to the output terminal of the above OR gate OR1, and another input terminal is connected to the output terminal A<B of the first comparator 42.

An input terminal of the OR gate OR2 is OR connected to the irregular signal input terminal 103 and another input terminal is connected to the output terminal of the AND gate AN 1.

Similarly, an input terminal of the OR gate OR3 is connected to the irregular signal input terminal 103 and another input terminal is connected to the output terminal of the AND gate AN2.

These OR gates OR2 and OR3 provide the 2-bit selection data to the multiplexer 30.

On the other hand, a BPF 108 in an output stage 100 of luminance and color signals, filters the output of the multiplexer 30 to provide a color signal C.

A delay 104 delays the 1 H-delayed video signal VH by a predetermined time, and a subtracter 106 subtracts the color signal C from the 1 H-delayed video signal VH to generate a luminance signal Y. In the present invention composed as described above, if the power is turned on and the digital video signal V is applied to the first 1 H delay 11 and the subtracter 13, the first 1 H delay, 11, delays the video signal V, to generate the 1 H-delayed video signal, and the second 1 H delay, 12, delays the 1 H delayed video signal VH once more, to generate the 2 H-delayed video signal VHH.

The subtracter 13 subtracts the video signal V from the 1 H-delayed video signal VH and provides the result to the first half-amplifier 15.

Then the output of the subtracter 13 is decreased to half by the first half-amplifier 15 and, subsequently, is provided to the input terminal $I_1$ of the multiplexer 30, as the first 1 H comb data, related to the video signal V and the 1 H-delayed video signal VH.

Also, the subtracter 14 subtracts the 2 H-delayed video signal VHH from the 1 H-delayed video signal VH and provides the result to the second half-amplifier 16.

Similarly, the output of the subtracter 14 is decreased by one half, by the second half-amplifier 16 and, subsequently, is provided to the input terminal $I_2$ of the multiplexer, as the second 1 H comb data related to the 1 H-delayed video signal VH and the 2 H-delayed video signal VHH.

The adder 17 adds the first and second 1 H comb data to each other and provides the result to the third half-amplifier 18.

Then the output of the adder 17 is decreased by one half by the third half-amplifier 18 and, subsequently, is provided to the input terminal Io of the multiplexer 30, as the 2 H comb data related to the three horizontal scanning lines, that is, the video signal V, the 1 H-delayed video signal VH, and the 2 H-delayed video signal VHH.

On the other hand, the first and second LPF's, 22 and 24, detect the low band transitions generated between each horizontal scanning line pair, by filtering the first and second 1 H comb data and provide the detected low band transitions to the first and second absolute value detector 26 and 28, respectively.

Then, the first and second absolute value detectors 26 and 28 are output to the first and second correlation data by detecting the absolute values of the detected low band transitions, respectively. At this time, the first and second correlation data are used to detect the degree of correlation between the present input video signal V and the 1 H-delayed video signal VH and the 2 H-delayed video signal VHH, respectively.

A smaller absolute value means a larger degree of correlation, while a larger absolute value means a smaller degree of correlation. That is, the large absolute value means the generation of the low band transition.

The first correlation data is applied to each input terminal A of the first and second comparators 42 and 44, while the second correlation data is applied to the input terminal B of the first comparator 42 and to the input terminal A of the third comparator 46. Also, the reference data, which is applied in common to the input terminals B of the second and third comparators 44 and 46, is used to measure the level of the correlation pro- vided from a system control microcomputer; this is not shown in figures.

On the other hand, if both the first and second correlation data are smaller than the reference data, the outputs of the second and third comparators become '0' and the outputs of the AND gates AN1 and AN2 also become '0'. At this time, if the input video signal is a regular one, the outputs of the OR gates OR2 and OR3 become '0', since a low data, that is, '0', is applied through the irregular signal input terminal 103. Thus, the 2-bit selection data '00' is applied to the selection terminals Bo and $B_1$ of the multiplexer 30, so that the 2 H comb data is selected by the multiplexer 30.

Contrarily, if both the first and second correlation data are larger than the reference data, the outputs of the second and third comparators become '1' and, thus, the AND gates AN1 and AN2 are enabled. In this enabled state, if the first correlation data is larger than the second correlation data, the level of correlation between the video signal V and the 1 H-delayed video signal is smaller than that of correlation between the 1 H-delayed video signal VH and the 2 H-delayed video signal VHH, and the output terminals A>B and A<B of the first comparator 42 provide '1' and '0', respectively.

Thus, the outputs of the OR gates OR2 and OR3, that is, the 2-bit selection data, become '10', and the multiplexer 30 selects and provides the 2 H comb data.

Contrarily, if the second correlation data is larger than the first correlation data, the level of correlation between the video signal V and the 1 H-delayed video signal VH is larger than that of correlation between the 1 H-delayed video signal VH and the 2 H-delayed video signal VHH, and the output terminals A>B and A<B provide '0' and '1', respectively.

Thus, the outputs of the OR gates OR2 and OR3, that is, the 2-bit selection data, becomes '11', and the multiplexer 30 selects and provides the 1 H-delayed video signal.

Thus, the BPF 108 provides the color signal c by filtering the output of the multiplexer 30, and the delay 104 delays the 1 H-delayed video signal VH by a predetermined time and provides the delayed signal in synchronization with the color signal c. Then, the subtracter 6 separates only the luminance signal, by subtracting the color signal from the 1 H-delayed video signal VH.

As mentioned above, the present invention can reduce the noise, as a circuit which adaptively performs the 1 H comb-filtering or the 2 H comb-filtering, according to the correlations among the video signals on the three horizontal scanning lines, in the separation of the luminance and color signal of the digital color television.

Also, even if the irregular video signal is applied, the present invention can reduce the artifact, by passing it without comb-filtering.

What is claimed is:

1. A pattern-adaptive digital comb filter, comprising:
   comb filter means for providing first 1 H comb data and second 1 H comb data by comb-filtering input video signals of three successive horizontal scanning lines, and for providing 2 H comb data by comb-filtering said input video signals of three horizontal scanning lines;
   correlation data generation means, connected to said comb filter means, for providing first correlation data and second correlation data by detecting low band transitions of luminance signals produced from horizontal line pairs through low pass filtering and absolute value detection of said first 1 H comb data and said second 1 H comb data;

multiplexer means, connected to said comb filter means, for selecting and providing one of said first 1H comb data, said second 1 H comb data, and said 2 H comb data according to selection data; and comb-filtering controller means, connected to said correlation data generator means and said multiplexer means, for generating said selection data to select said 2 H comb data when both said first correlation data and said second correlation data are smaller than reference data applied through a reference data terminal, and to select a more highly correlated one of said first 1 H comb data and said second 1 H comb data by comparing magnitudes of said first correlation data to magnitudes of said second correlation data when either said first correlation data or said second correlation data is not smaller than said reference data.

2. The digital comb filter of claim 1, wherein said comb filter means comprises:

a first delay for providing one horizontal scanning period-delayed video signals by delaying said input video signals for one horizontal scan period;

a second delay for providing two horizontal scanning period-delayed video signals by delaying said one horizontal scanning period-delayed video signals for another horizontal scan period;

a first subtracter for obtaining first differences between said input video signals and said one horizontal scanning period-delayed video signals to provide said first 1 H comb data;

a second subtracter for obtaining second differences between said two horizontal scanning period-delayed video signals and said one horizontal scanning period-delayed video signals to provide said second 1 H comb data; and an adder for obtaining sums of said first 1 H comb data added to said second 1 H comb data to provide said 2 H comb data.

3. The digital comb filter of claim 1, wherein said correlation data generator means comprises:

a first low pass filter and a second low pass filter respectively receiving said first 1 H comb data and said second 1 H comb data, for detecting low band transitions generated between each comb-filtered horizontal scanning line pair by low pass filtering of said first 1 H comb data and said second 1 H comb data, respectively; and first absolute value detecting means and second absolute value detecting means connected respectively to said first low pass filter and said second low pass filter, for providing first correlation data and second correlation data by detecting absolute values of the detected low band transitions.

4. The digital comb filter according to claim 1, wherein said comb-filtering controller means comprises:

a first comparator, having input terminals connected respectively to said first absolute value detecting means and said second absolute value detecting means, for comparing said first correlation data and said second correlation data and providing first comparison results;

a second comparator, having input terminals respectively connected to said first absolute value detecting means and said reference data terminal, for comparing said first correlation data and said reference data and providing second comparison results;

a third comparator, having input terminals respectively connected to said second absolute value detecting means and said reference data terminal, for comparing said second correlation data and said reference data and providing third comparison results; and logic means for generating said selection data in response to said first comparison results, said second comparison results, and said third comparison results.

5. The digital comb filter of claim 1, further comprised of said comb filter means generating one horizontal scanning period-delayed video signals.

6. The digital comb filter of claim 5, wherein said multiplexer means provides one of said first 1 H comb data, said second 1 H comb data, said 2 H comb data, and said one horizontal scanning period-delayed video signals according to said selection data.

7. The digital comb filter of claim 2, wherein said comb filter means further comprises:

first half amplifier means connected to an output terminal of said first subtracter for dividing said first comb data received by said adder by a factor of two;

second half amplifier means connected to an output terminal of said second subtracter for dividing said second comb data received by said adder by a factor of two; and third half-amplifier means, connected to an output terminal of said subtracter, for dividing said second 2 H comb data by a factor of two.

8. The digital comb filter of claim 6, wherein said comb-filtering controller means selects said one horizontal scanning period-delayed video signals when an irregular signal is present.

9. The digital comb filter of claim 1, wherein said 2 H comb data generated in response to said first 1 H comb data and said second 1 H comb data.

10. The digital comb filter of claim 4, wherein said logic means comprises:

first OR gate means for logically combining said second comparison results and said third comparison results to generate first logic results;

first AND gate means for logically combining said first logic results and said first comparison results to generate second logic results;

second AND gate means for logically combining said first logic results and said first comparison results to generate third logic results;

second OR gate means for logically combining said second logic results and irregular signal results to generate first parts of said selection data; and third OR gate means for logically combining said third logic results and said irregular signal results to generate second parts of said selection data.

11. The digital comb filter of claim 3, wherein said comb filter means comprises:

first delay means for providing said one horizontal scanning period-delayed video signals by delaying said input video signals for one horizontal scan period;

second delay means for providing two horizontal scanning period-delayed video signals by delaying said one horizontal scanning period-delayed video signals for one horizontal scan period;

first subtractor means for obtaining said first 1 H comb data by calculating differences between said input video signals and said one horizontal scanning period-delayed video signals;

second subtracter means for obtaining said 1 H comb data by calculating differences between said two horizontal scanning period-delayed video signals and said one horizontal scanning period-delayed video signals; and adder means for performing two horizontal scanning period comb-filtering and calculating said 2 H comb data by calculating sums of said first 1 H comb data added to said 1 H second comb data.

12. A pattern-adaptive digital comb filter, comprising:

comb filter means for providing first 1 H comb data and secod 1 H comb data by comb-filtering input video signals of three successive horizontal scanning lines, and for providing 2 H comb data by combining said first 1 H comb data with said second 1 H comb data;

first low pass filter means for providing first correlation data by detecting low band transitions of luminance signals between horizontal scan lines in said first 1 H comb data;

second low pass filter means for providing second correlation data by detecting low band transitions of luminance signals between horizontal scan lines in said second 1 H comb data;

first absolute value means for providing first absolute values of said first correlation data;

second absolute value means for providing second absolute values of said second correlation data;

multiplexer means for providing one of said first 1 H comb data, said second 1 H comb data, and said 2 H comb data as selected comb data in dependence upon selection data;

comb-filtering controller means for generating said selection data to select said 2 H comb data when both said first correlation data and said second correlation data are smaller than reference data, and to select a more highly correlated one of said first 1 H comb data and said second 1 H comb data by comprising said first absolute values to second absolute values when at least one of said first correlation data and said second correlation data is larger than said reference data; and means for providing luminance signals and color signals by separating said luminance signals from said input vide signals in dependence upon said selected comb data.

13. A digital comb filter as claimed in claim 12, wherein said comb filter means comprises:

first delay means for providing one horizontal scanning period-delayed video signals by delaying said input video signals for one horizontal scan period;

second delay means for providing two horizontal scanning period-delayed video signals by delaying said one horizontal scanning period-delayed video signals for another horizontal scan period;

first subtracter means for obtaining first differences between said input video signals and said one horizontal scanning period-delayed video signals to provide said first 1 H comb data;

second subtracter means for obtaining second differences between said two horizontal scanning period-delayed video signals and said one horizontal scanning period-delayed video signals to provide said second 1 H comb data; and adder means for obtaining sums of said first 1 H comb data added to said second 1 H comb data to provide said 2 H comb data.

14. A digital comb filter as claimed in claim 12, wherein said comb-filtering controller means comprises:

first comparator means for providing first comparison results by comparing said first absolute values with said second absolute values;

second comparator means for providing second comparison results by comparing said first absolute values data with said reference data;

third comparator means for providing third comparison results by comparing said second absolute values with said reference data; and logic means for generating said selection data in response to said first comparison results, said second comparison results, and said third comparison results 15. A digital comb filter as claimed in claim 13, wherein said comb-filtering controller means comprises:

first comparator means for providing first comparison results by comparing said first absolute values with said second absolute values;

second comparator means for providing second comparison results by comparing said first absolute values data with said reference data;

third comparator means for providing third comparison results by comparing said second absolute values with said reference data; and logic means for generating said selection data in response to said first comparison results, said second comparison results, and said third comparison results.

16. A digital comb filter as claimed in claim 12, wherein said logic means comprises:

first OR gate means for logically combining said second comparison results and said third comparison results to generate first logic results;

first AND gate means for logically combining said first logic results and said first comparison results to generate second logic results; and second AND gate means for logically combining said first logic results and said first comparison results to generate third logic results.

17. A pattern-adaptive digital comb filter, comprising:

comb filter means for providing first 1 H comb data and second 1 H comb data by comb-filtering input video signals of three successive horizontal scanning lines, and for providing 2 H comb data by combining said first 1 H comb data with said second 1 H comb data;

means for providing first correlation data by detecting low band transitions of luminance signals between horizontal scan line pairs in said first 1 H comb data, and for providing second correlation data by detecting low band transitions of luminance signals between horizontal scan line pairs in said second 1 H comb data;

multiplexer means for providing one of said first 1 H comb data, said second 1 H comb data, said 2 H comb data, and said input video signals as selected video data in dependence upon selection data;

controller means for generating said selection data so that said multiplexer means provides said input video signals in response to reception of an irregular signal indicative of said input video signal being irregular, provides said 2 H comb data when both said first correlation data and said second correlation data are smaller than reference data, and provides a more highly correlated one of said first 1 H comb data and said second 1 H comb data in response to comparisons of said first correlation data to said second correlation data when at least one of said first correlation data and said second correlation data is larger than said reference data;

bandpass filter means for bandpass filtering said selected video data to generate filtered video data; and luminance signal generating means for separating luminance signals from said input video signals by subtracting said filtered video data from said input video signals.

18. A digital comb filter as claimed in claim 17, wherein said comb filter means comprises:

first delay means for providing one horizontal scanning period-delayed video signals by delaying said input video signals for one horizontal scan period, said one horizontal scanning period-delayed video signals being said input video signals provided by said multiplexer means;

second delay means for providing two horizontal scanning period-delayed video signals by delaying said one horizontal scanning period-delayed video signals for another horizontal scan period;

first subtracter means for obtaining first differences between said input video signals and said one horizontal scanning period-delayed video signals to provide said first 1 H comb data;

second subtracter means for obtaining second differences between said two horizontal scanning period-delayed video signals and said one horizontal scanning period-delayed video signals to provide said second 1 H comb data; and adder means for obtaining sums of said first 1 H comb data added to said second 1 H comb data to provide said 2 H comb data.

19. A digital comb filter as claimed in claim 17, further comprising means for providing first absolute values of said first correlation data, and for providing second absolute values of said second correlation data; wherein said comb-filtering controller means comprises:

a first comparator for providing first comparison results by comparing said first absolute values with said second absolute values;

a second comparator for providing second comparison results by comparing said first absolute values data with said reference data;

a third comparator for providing third comparison results by comparing said second absolute values with said reference data; and logic means for generating said selection data in response to said first comparison results, said second comparison results, and said third comparison results.

20. A digital comb filter as claimed in claim 18, further comprising means for providing first absolute values of said first correlation data, and for providing second absolute values of said second correlation data; wherein said comb-filtering controller means comprises:

a first comparator for providing first comparison results by comparing said first absolute values with said second absolute values;

a second comparator for providing second comparison results by comparing said first absolute values data with said reference data;

a third comparator for providing third comparison results by comparing said second absolute values with said reference data; and logic means for generating said selection data in response to said first comparison results, said second comparison results, and said third comparison results.

21. A digital comb filter as claimed in claim 19, wherein said logic means comprises:

first OR gate means for logically combining said second comparison results and said third comparison results to generate first logic results;

first AND gate means for logically combining said first logic results and said first comparison results to generate logic results;

second AND gate means for logically combining said first logic results and said first comparison results to generate third logic results.

second OR gate means for logically combining said second logic results and said irregular signal to generate first parts of said selection data; and third OR gate means for logically combining said third logic results and said irregular signal to generate second parts of said selection data.

22. A digital comb filter as claimed in claim 12, wherein said comb-filtering controller means selects said more highly correlated one of said first 1 H comb data and said second 1 H comb data in response to a determination of a smaller one of said first absolute values and said second absolute values.

23. A digital comb filter as claimed in claim 17, wherein said controller means selects said more highly correlated one of said first 1 H comb data and said second 1 H comb data in response to a determination of a smaller one of said first correlation data and said second correlation data.

24. A digital comb filter as claimed in claim 1, further comprising said comb-filtering controller means generating said selection data to select said input video signals received by said multiplexer means in response to an indication of said input video signals being irregular.

25. A digital comb filter as claimed in claim 12, further comprised of said comb-filtering controller means generating said selection data to select said input video signals received by said multiplexer means in response to an indication of said input video signals being irregular.

26. A pattern-adaptive digital comb filter, comprising:

first delay means for providing first delayed video signals by delaying input video signals for a first horizontal scan period;

second delay means for providing second delayed video signals by delaying said first delayed video signals for a second horizontal scan period;

first subtracter means for obtaining first differences between said input video signals and said first delayed video signals to provide first 1 H comb data;

second subtracter means for obtaining second differences between said first delayed video signals and said second delayed video signals to provide second 1 H comb data;

adder means for obtaining sums of said first 1 H comb data to said second 1 H comb data to provide 2 H comb data;

means for providing first correlation data by detecting low band transitions of luminance signals between horizontal scan line pairs in said first 1 H comb data, and for providing second correlation data by detecting low band transitions of luminance signals between horizontal scan line pairs in said second 1 H comb data;

multiplexer means for providing one said first 1 H comb data, said second 1 H comb data, said 2 H comb data, and said first delayed video signals as selected video data in dependence upon selection data;

means for providing first absolute values of said first correlation data, and for providing second absolute values of said second correlation data;

controller means for generating said selection data so that said multiplexer means provides said first delayed video signals in response to reception of an irregular signal indicative of said input video signal being irregular, provides said 2 H comb data when both said first absolute values and said second absolute values are smaller than reference data, and provides a more highly correlated one of said first 1 H comb data and said second 1 H comb data in response to comparisons of said first absolute values with said second absolute values when at least one of said first absolute values and said second absolute values is larger than said reference data, said controller means comprising:
 a first comparator for providing first comparison results by comparing said first absolute values with said second absolute values,
 a second comparator for providing second comparison results by comparing said first absolute values data with said reference data;
 a third comparator for providing third comparison results by comparing said second absolute values with said reference data,
 first gate means for logically combining said second comparison results and said third comparison results to generate first logic results,
 second gate means for logically combining said first logic results and said first comparison results to generate second logic results,
 third gate means for logically combining said first logic results and said first comparison results to generate third logic results,
 fourth gate means for logically combining said second logic results and said irregular signal to generate first parts of said selection data, and
 fifth gate means for logically combining said third logic results and said irregular signal to generate second parts of said selection data;

bandpass filter means for bandpass filtering said selected video data to generate filtered video data; and luminance signal generating means for separating luminance signals from said first delayed video signals in dependence upon said filtered video data.

27. A digital comb filter, comprising:
comb filter means coupled to receive input video signals, for providing first delayed video signals and second delayed video signals by comb-filtering said input video signals, and for providing third video signals by combining said first and second delayed video signals;

correlation means for providing first and second correlation signals by detecting low band transitions of luminance signals between horizontal scan line pairs in said first and second delayed video signals, respectively;

selection means for selecting one of said first delayed video signals, said second delayed video signals, said third video signals, and said input video signals as selected video signals in dependance upon selection signals;

controller means for generating said selection signals for enabling said selection means to select said input video signals as said selected video signals in response to reception of an irregular signal indicative of said input video signal containing errors, select said third video signals as said selected video signals when both said first correlation signals and said second correlation signals are smaller than reference signals, and select a higher correlated one of said first delayed video signals and said second delayed video signals as said selected video signals in dependence upon comparisons of said first correlation signals with said second correlation signals when at least one of said first correlation signals and said second correlation signals is larger than said reference signals; and means for providing color signals from said selected video signals and providing luminance signals from said input video signals in dependence upon said color signals.

28. A digital comb filter as claimed in claim 27, wherein said comb filter means comprises:
 first delay means for providing one horizontal scanning period-delayed video signals by delaying said input video signals for one horizontal scan period;
 second delay means for providing two horizontal scanning period-delayed video signals by delaying said one horizontal scanning period-delayed video signals for another horizontal scan period;
 first subtracter means for obtaining first differences between said input video signals and said one horizontal scanning period-delayed video signals to provide said first delayed video signals;
 second subtracter means for obtaining second differences between said two horizontal scanning period-delayed video signals and said one horizontal scanning period-delayed video signals to provide said second delayed video signals; and
 adder means for adding first and second delayed video signals to provide said third delayed video signals.

29. A digital comb filter as claimed in claim 27, further comprised of said correlation means comprising low-pass filter means for providing said first and second correlation signals and absolute value detector means for providing first and second absolute values of said first and second correlation signals, respectively, and said controller means comprising:
 a first comparator for providing first comparison results by comparing said first absolute values with said second absolute values;
 a second comparator for providing second comparison results by comparing said first absolute values data with said reference data;

a third comparator for providing third comparison results by comparing said second absolute values with said reference data; and logic means for generating said selection signals in response to said first comparison results, said second comparison results, and said third comparison results, said logic means comprising:

first OR means for logically combining said second comparison results and said third comparison results to generate first logic results;

first AND gate means for logically combining said first logic results and said first comparison results to generate second logic results;

second AND gate means for logically combining said first logic results and said first comparison results to generate third logic results.

second OR gate means for logically combining said second logic results and logic states of said irregular signal indicative of said input video signals as containing errors to generate first parts of said selection signals; and third OR gate means for logically combining said third logic results and said logic states of said irregular signal to generate second parts of said selection signals.

* * * * *